United States Patent [19]
Koch

[11] 4,041,457
[45] Aug. 9, 1977

[54] SOUND-SLIDE PROJECTOR CONTROL APPARATUS

[76] Inventor: Herbert Joachim Koch, Tiefenthaler Strasse 13, D-62 Wiesbaden, Germany

[21] Appl. No.: 667,362

[22] Filed: Mar. 16, 1976

[51] Int. Cl.² .................. H04Q 9/00; G03B 23/02; G03B 23/12
[52] U.S. Cl. .................. 340/147 MD; 353/26 A; 340/162
[58] Field of Search ....... 340/147 R, 147 P, 147 MD, 340/162; 209/73; 353/25, 26 R, 26 A, 103

[56] References Cited
U.S. PATENT DOCUMENTS

| | | | |
|---|---|---|---|
| 2,918,656 | 12/1959 | Nolde et al. | 340/162 X |
| 3,644,892 | 2/1972 | Szymber et al. | 340/147 R |
| 3,800,285 | 3/1974 | Peschke et al. | 340/162 |
| 3,930,992 | 1/1976 | Baumel et al. | 209/73 |
| 3,964,025 | 6/1976 | Oosterhouse | 340/162 |

*Primary Examiner*—Donald J. Yusko
*Attorney, Agent, or Firm*—Richard G. Stephens

[57] ABSTRACT

A sound-slide projector of a basic form illustrated in U.S. Pat. No. 3,732,000 is equipped with a keyboard which controls a digital servomotor to position a slide tray for random access to the sound-slides. Operation of a mechanical slide-changing mechanism formerly cyclically operated in a predetermined time by a flywheel is temporarily interrupted by a solenoid while the servomotor positions the slide tray to provide variable timing required for random selection of sound slides.

6 Claims, 6 Drawing Figures

SOUND-SLIDE PROJECTOR CONTROL APPARATUS

BACKGROUND OF THE INVENTION

The present invention relates to a digital control unit for controlling a sound-slide projector and more particularly to a digital control unit for controlling a sound projector which permits the random selection of slides to be projected.

In the prior art, there are many sound-slide projectors of the type which include a movable audio disk having a transparency mounted coaxial therewith in which a plurality of different slides are mounted in a tray movable parallel to the optical projection axis. A slide changing mechanism driven by a fly wheel, a slide projection system and a sound transmission unit of the type referred to are shown in U.S. Pat. No. 3,732,000 to Annette et al.

In prior art projectors of this type such as that shown by the Annette et al. patent, the presentation of sound - slides carried in a slide tray occurs as follows. A tray carrying a pre-determined number of slides is inserted into a channel from the rear of the projector. To align the first slide with an insertion slot of the projector assembly, a handle on the slide changing mechanism must be operated. The slide tray can then be advanced until the first slide is correctly aligned with a slide insertion push rod at the edge of a slot in the slide tray and with the insertion slot of the projector. The handle is then manually operated so that the slide insertion push rod pushes the first slide from the slide tray into projection position.

At this point a pressure roller actuated control arm with a slide return guide rod is activated so that a spring presses a pressure roller against a drive roller and against the audio disk on the slide. The audio disk is then rotated about its own axis while a pick-up engages the disk for recording or playback. The drive roller and pressure roller rotate the audio disk with a constant angular velocity. When the transmitter or pickup has reached the end of the sound track, electrical contacts are closed to energize a solenoid. This solenoid causes a roller to rotate a gear wheel or pinion. A cylindrical projection or pin on the pinion then initiates the return of the slide to the slide tray, by way of the control arm and a slide-return guide-rod connected to the slide insertion pushrod.

At the start of the slide return process, the transmitter pickup and the pressure roller are caused to disengage from the audio disc so that rotation of the audio disc stops.

As the pinion continues to rotate, the slide-return guide-rod guides the slide completely back into the proper compartment of the slide tray, which is then advanced one position by a gear, so that the next compartment is aligned with the insertion slot.

Rotation of the pinion finally causes insertion of the slide in the new compartment into projection position by the slide-insertion pushrod. As soon as this position is reached, driving of the pinion is interrupted, and the pressure roller, the drive roller and the transmitter pickup are engaged with the audio disc. Then the transparency carried in the sound slide is projected, and simultaneously, information can be recorded in the audio disc or played back from it.

Each slide can be transported from the slide tray to projection position and then returned to the slide tray in the aforementioned manner.

It will be seen that such projectors operate only with a slide tray which moves forwardly step-by-step, or one slide at a time, and they only permit exhibition of the slides in a fixed sequence. The order of presentation is pre-determined by the storing or placement of the slides in the slide tray, so that a change in the sequence is not possible.

SUMMARY OF THE INVENTION

Therefore, it is a primary object of the present invention to provide improved sound-slide projection apparatus which utilizes a slide-changing mechanism basically like that of U.S. Pat. No. 3,732,000 but which allows an operator to randomly select slides for presentation from a group of slides arranged in a slide tray.

It is a further object of the present invention to provide such apparatus which will randomly access and select slides for presentation in a slide projector in a short time interval on the order of five seconds or less.

Yet another object of the present invention is to randomly select slides for presentation in a slide projector by a control apparatus including a manual entry keyboard for entering the position number of the slide to be selected, an intermediate storage having a validity checker for checking the validity of the slide number entered from the keyboard, a main storage for holding the position number entered from the keyboard, a display device connected to the storage for visually displaying the selected position number entered, a comparator circuit for comparing the position number selected with the current position of the slide tray, the comparator having the capability of producing a forward or reverse signal to drive a motor in a forward or reverse direction depending upon the comparison between the current position of the slide tray and the selected position stored in the main storage.

Accordingly, apparatus embodying the present invention includes a slide projector having a slide tray movable along an axis parallel to the optical projection axis, a reversible drive motor for transporting the slide tray in either a forward or reverse direction as required, a position sensing means, a disconnecting solenoid for controlling a flywheel for stopping the slide-changing mechanism in a position which will allow the slide tray to be moved in a forward or reverse direction, a control circuit including a manual entry keyboard for entering a two-digit number representing the position number of the selected slide, an intermediate storage unit having a validity checker for determining whether the position number manually entered is within the capacity of the slide tray, a main storage for holding the selected position number, a display connected to the main storage for displaying the selected position number, a comparator circuit for comparing the selected position number with the actual position of the slide tray, and a counter connected to the drive motor for maintaining a count representing the position of the slide tray at any instant.

A control unit constructed according to the present invention may be contained in a separate housing remote from the projector apparatus or it may be housed in the housing of prior art slide projectors.

It is an advantage of the present invention that slides may be exhibited in any desired sequence or order. Thus, for example, the slide tray can be moved backward or forward to any position from any other position.

These and other objects, features, and advantages of the present invention may be seen from the following description of a preferred embodiment of the present invention.

DETAILED DESCRIPTION OF A PREFERRED EMBODIMENT OF THE PRESENT INVENTION

Figure 1:
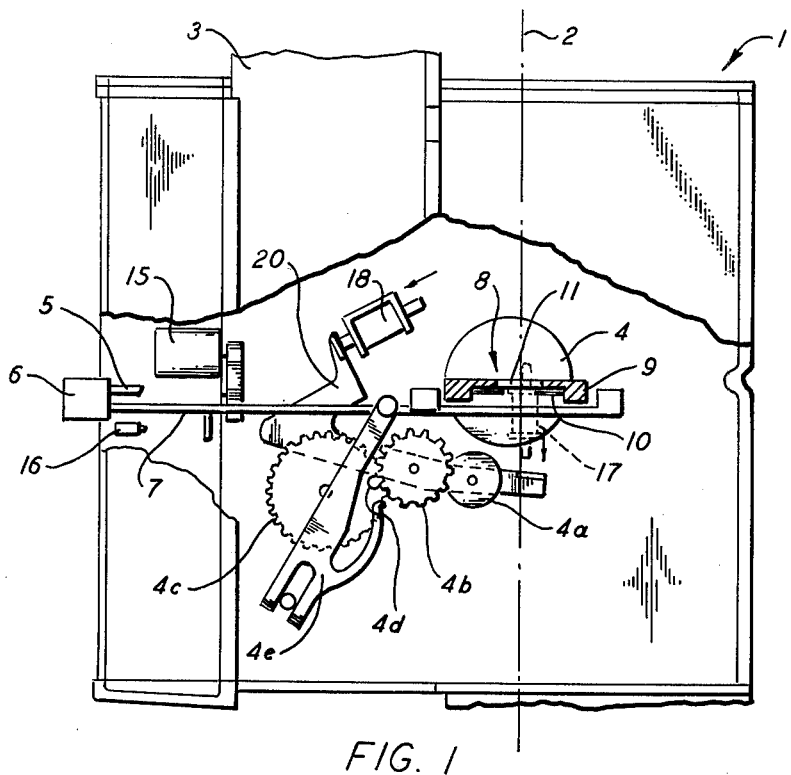
FIG. 1 is a top view of a projector for sound-slides showing the slide insertion mechanism.

Referring now to FIG. 1, the mechanical slide changing apparatus shown in FIG. 1 is essentially the same as that disclosed in U.S. Pat. No. 3,723,000 to Annette et al. For a complete description of a sound-slide projector which may employ the random access control unit according to the present invention as an improvement, said patent to Annette et al. is incorporated herein by reference. More particularly, FIGS. 2 and 3 of the Annette et al. patent are referred to as an example of slide-changing apparatus which could be used with the present invention.

With respect ot FIG. 1, projector 1 for sound-carrying slides, has a slide tray 3 which is slidably mounted so as to be moved back and forth parallel to optical axis 2.

A plurality of slides such as slide 9 shown in projection position are mounted in an aligned manner in slide tray 3.

Pinion 4c connected to gear 4b and wheel 4a is driven by fly wheel 4 whenever solenoid 18 rotates arm 20 to move wheel 4a against the flywheel. Pinion 4c rotates control arm 4e by means of pin 4d which reciprocates in a slot in control arm 4e. One end of control arm 4e is connected to slide return guide rod 7 which is connected to slide insert push rod 5. Slide return guide rod 7 and the slide insert push rod 5 are connected by a handle not shown to the slide-changing mechanism 6. Slide insert push rod 5 and slide return guide rod 7 provide for transport of a slide 9 from slide tray 3 to projection and transmission unit 8 and for return of the slide to the tray. This operation is described in detail in the aforementioned U.S. Pat. No. 3,723,000.

When a slide 9 has entered the projection and transmission unit 8, a coupling of audio disc 10 with fly wheel 4 is effected, and a transmitter pickup (not shown in FIG. 1) engages the audio disc. As soon as the pickup has completed a transmission, it actuates solenoid 18 via contacts (not shown in FIG. 1). The solenoid rotates lever 20 counterclockwise so that wheel 4a is moved against fly wheel 4, thereby driving pinion 4c via step-up gear 4b, and the slide is returned to the slide tray by rotation of control arm 4e and consequent leftward translation of slide return guide rod 7. In the prior system of U.S. Pat. No. 3,732,000 pinion 4c continues to rotate, and after a very brief delay during which the pin on pinion 4c moves across the slot in arm 4e and the slide trayis advanced one step, the arm is driven clockwise and rod 7 driven rightwardly to move a new slide into unit 8. However, in accordance with the present invention, the leftward end or limit position of the slide-changing mechanism (i.e., the leftward limit positions of the slide insertion push rod 5 and the slide return guide rod 7) is sensed by a position sensor 16 which is operative to interrupt rotation of pinion 4c while a servomotor positions the slide tray. Sensor 16 controls a disconnect solenoid 17 which disengages the wheel 4a from flywheel 4. Thus, when the slide return guide rod 7 reaches its leftward limit position, the flywheel drive for the slide-changing mechanism is interrupted. Simultaneously, the actuation of sensor 16 activates the drive motor 15 provided to position the slide tray 3. Motor 15 then can move slide tray 3 backward and forward as desired, in a direction parallel to the optical axis 2. With such an arrangement, the time during which rod 7 stays at its leftward limit and the slide tray can be moved will be seen not to depend upon the width of the slot in arm 4e.

Figure 2:
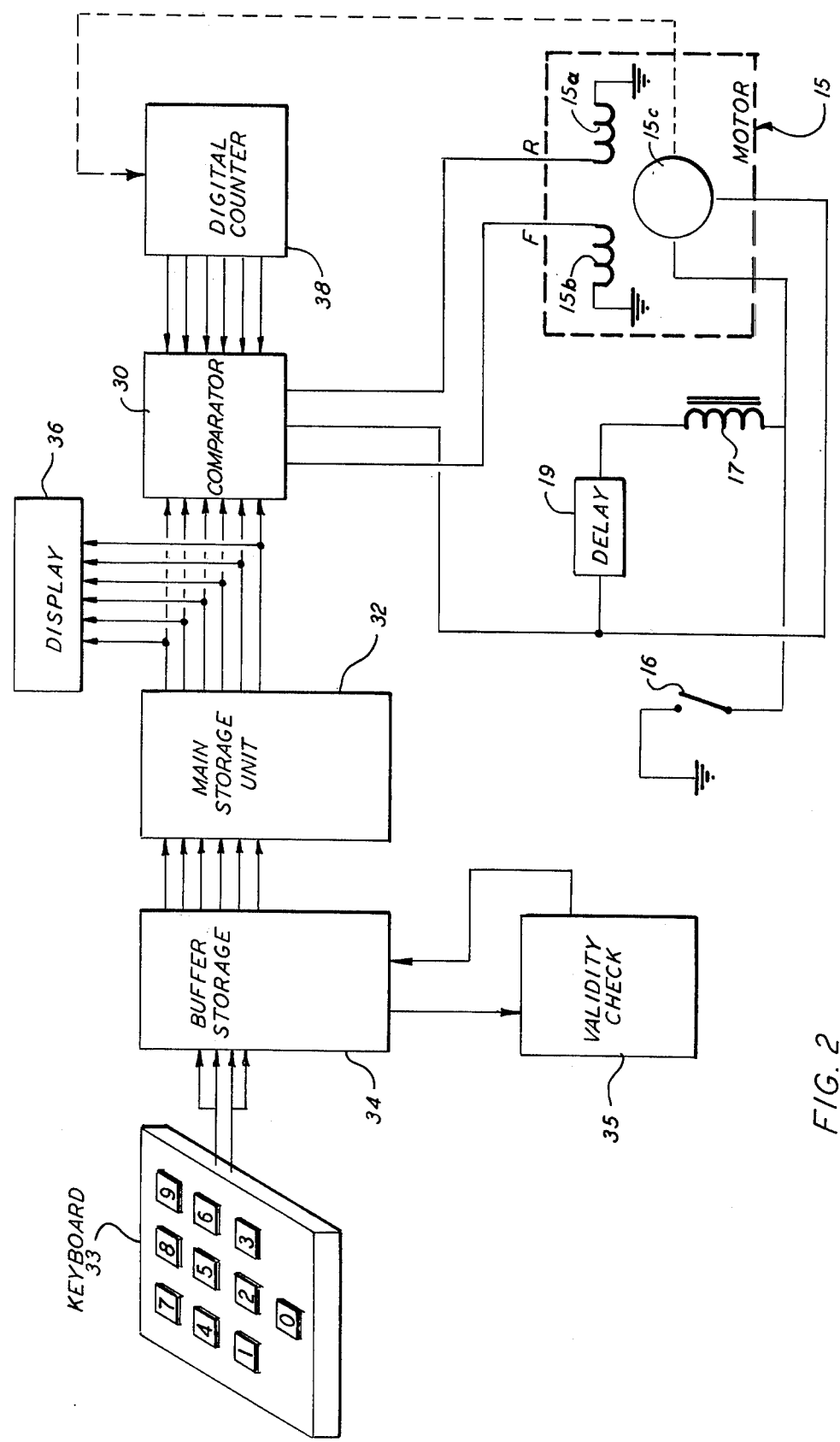
FIG. 2 is a block diagram of a circuit of a control unit according to the present invention.

Referring now to FIG. 2, a block diagram of the control apparatus according to the present invention is shown.

Manual entry keyboard 33 is connected to intermediate buffer storage 34 which receives two-digit decimal numbers from the 10-button keyboard 33. Buffer storage 34 temporarily holds the selected slide position number while validity check circuit 35 determines whether the number is within the capacity of the slide tray. For example, if a slide tray is being used which has a 36-position capacity, and the operator should manually enter 37 as the number of the selected slide, the validity check circuit 35 would issue an "invalid" signal.

Assuming a valid position number has been selected, the number is transferred from buffer storage 34 to main storage 32 as a two-digit binary coded decimal number. Main storage 32 is connected to visual display 36 and to comparator circuit 30. Visual display circuit 36 displays the two-digit decimal number selected by the operator.

Comparator circuit 30 has has a second set of inputs a position count from counter 38. The position count is derived from motor 15 to maintain a count representing the position of slide tray 3 at any instant.

Comparator circuit 30 compares the position count from counter 38 with the selected position number from main storage 32 and determines whether the selected position number is lower than, equal to, or higher than the position count.

Of course, if the selected position is equal to the position count, slide tray 3 is not moved. No signal is sent to motor 15. However, if the selected number is less than the position count, a signal is transmitted to reverse field winding 15a and an activate motor signal is transmitted to motor 15 to cause motor 15 to move slide tray 3 in a reverse direction unitl the output of position counter 38 equals the selected position number in main storage 32.

Similarly, if the selected position is a higher number than the position count representing the current position of slide tray 3, an activate signal is sent to forward field winding 15b of motor 15 to cause motor 15 to move in a forward position until the motor position count equals the selected position number.

When the slide tray 3 has reached the selected position, motor 15 is stopped and after a short delay, solenoid 17, the disconnect solenoid, is de-activated. This initiates resumption of operation of the slide-changing mechanism of the projector so that the newly-selected slide is moved into the projection position in the manner heretofore described.

Figure 3:
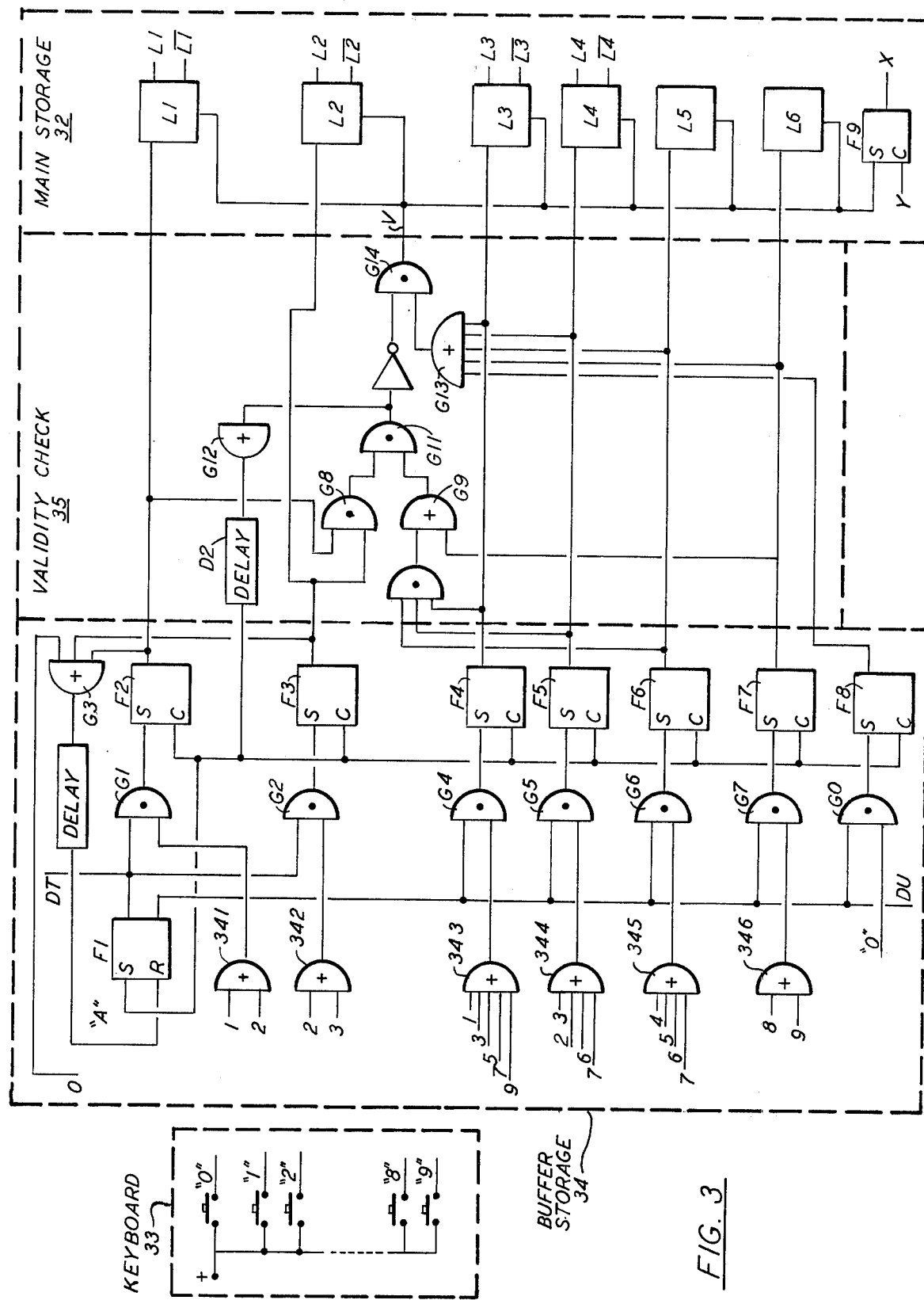
FIG. 3 is a logic diagram showing the connections between the keyboard, the intermediate storage, the validity checker and the main storage shown as blocks in FIG. 2.

Referring now to FIG. 3, the interconnection between keyboard 33, intermediate storage 34, validity check circuit 35 and main storage 32 will be described in further detail.

Keyboard 33 contains 10 keys labeled 0--9 each having a separate output line so that, for example, if key "0" was pressued, the associated output line labeld "0" would become activated or a logic one (1). Keyboard lines 0-9 are connected to gates 314, 342, 343, 344, 345, and 346 in combinations which represent the binary equivalance to the decimal number entered from the keyboard. For example, since the decimal numbers 1, 3, 5, 7 and 9, when converted to four-bit binary representation, each contain a 1 in the unit's ($2^0$) position, keyboard outputs 1, 3, 5, 7 and 9 are each connected to separate inputs to OR gate 343. Similarly, OR gate 344 has an inputs keyboard output lines "3," "6," and "7" representing a 1 in the $2^1$ position. The inputs to gate 345 are those decimal numbers having a 1 in the $2^2$ position. These are keyboard output lines 2, 4, 6 and 7. In like manner, the inputs to OR gate 346 representing the $2^3$ of the binary system are keyboard output lines "8" and "8"and "9. "

In the present embodiment of a control unit of the present invention, selected slide position numbers must be entered as two-digit numbers, for example, if the number is between 1 and 9, the first digit entered must be 0 with the second digit being the appropriate number of the selected slide. The first digit entered in the 10's position may be 0, 1, 2 or 3 in the present embodiment assuming a slide tray capacity of 36 slides. If for example, the number 4 were entered by the operator as the first digit, it would not register and it would be rejected. Assuming that the operator correctly entered a 0, 1, 2 or 3 in the 10's position of the selected slide position number, OR gate 341 or 342 is activated if the selected 10's digit is 1, 2 or 3. OR gate 341 is connected as an input to AND gate G1; OR gate 342 is connected to AND gate G2. The enable input to both gates G1 and G2 is the "set" output of latch F1. Assuming that a correct number had been previously entered and accepted by the validity circuit 35, F1 has been set by a previous signal appearing at "A." This has enabled gates G1 and G2 to accept the 10's digit from keyboard 33. The output of gate G1 is connected to the set input of latch F2 and gate G2 is connected to the set input of latch F3. F2 and F3 provide temporary storage in binary form of numbers 1, 2 or 3. Assuming that a correct 10's digit 0, 1, 2 or 3 has been entered from keyboard 33, gate G3 is activated which through a short delay D1 resets latch F1 which now enables AND gates G4, G5, G6, G7 and G0 to accept the second or unit's digit of the selected slide position number. AND gate G4 has as its second input the output of OR gate 343 representing the $2^0$ binary bit of the unit's decimal number. AND gate G5 has as a second input, the output of OR gate 344, representing the $2^1$ binary position of the decimal number. The second input to AND gate G6 is the output of OR gate 345 representing the $2^2$ binary position. The second input to gate G7 is the output of OR gate 346 representing the $2^3$ binary position of the decimal number entered in the unit's position. The outputs of AND gates G4-G7 are connected to the set inputs of latches F4-F7 respectively. Assuming that an acceptable two-digit number has been entered from keyboard 33, the two-digit number stored in latches F2-F7 is transmitted to main storage latches L1-L6 respectfully.

Assuming, however, that a number beyond the capacity of the slide tray 3 is entered, such as 37 for a 36-slide tray, AND gate G8 and G9 would be activated, causing an output from gate G11 which would reset latches F2-F8 through gate G12 and delay D2, as well as disabling gate G14, preventing line V from rising and thereby preventing latches L1-L6 from accepting the outputs of latches F2-F7.

Since a 0 in the unit's position or second digit presents certain special problems, AND gate G0, having as a first input the unit's digit enable line from latch F1, and as a second input keyboard output line "0", is included. The output of gate G0 is connected to the set side of latch F8, which has a common reset or clear line with latches F2-F7. The output of F8 is connected as one input to OR gate G13 with the outputs from gates F4-F7 so that when any combination of digits in the unit's position of the selected number is activated, gate G13 provides an enable input to gate G14. Gate G14 is only activated if a second enabling input is received as a result of a valid indication output from gate G11. Assuming a valid output indication from gate G11, gate G14 is activated, raising line V, enabling latches L1-L6 in main storage to accept the number reprsented by the outputs of latches F2-F7.

Also, when line V is activated, gate G12 resets latches F2-F8 through delay D2. Delay D2 is set to allow sufficient time for main storage latches L2-L6 to become stable before the intermediate storage latches F2-F8 are cleared. Gates G8, G9, G10, G11 and G12, invertor I1, delay G2, and gate G14 are included in validity check circuit 35.

Latches L1, L2, L3, L4, L5, L6 and F9 comprise main storage 32.

Figure 4:
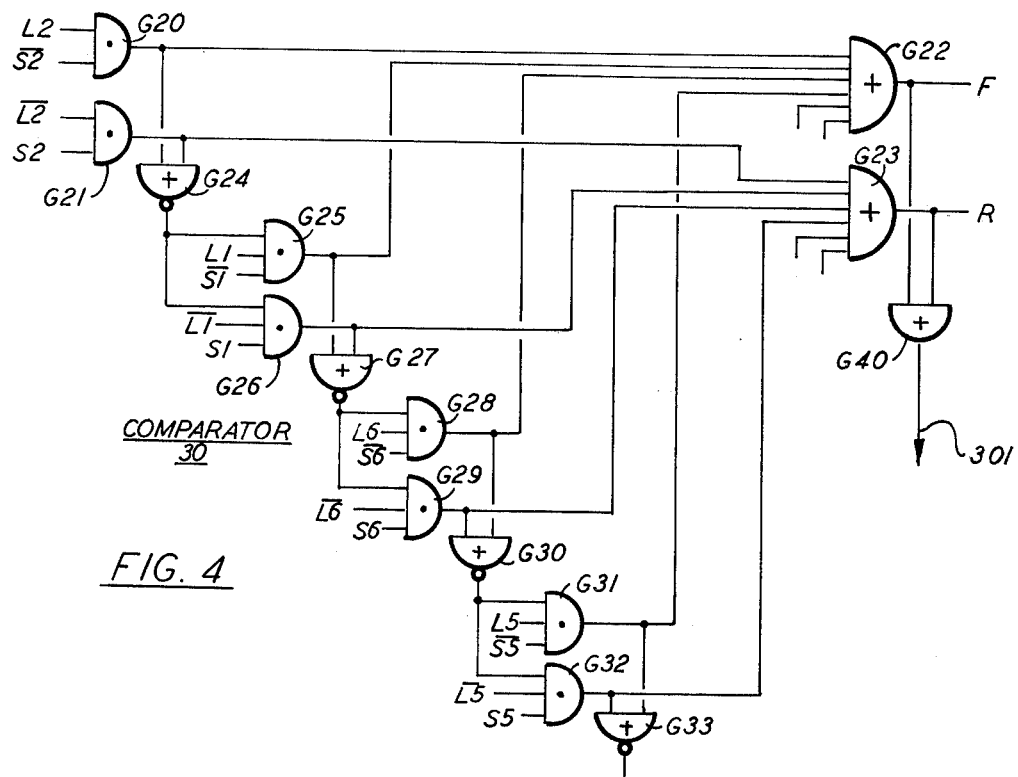
FIG. 4 is a logic diagram showing the circuit of the comparator shown in block form in FIG. 2.
Figure 5:
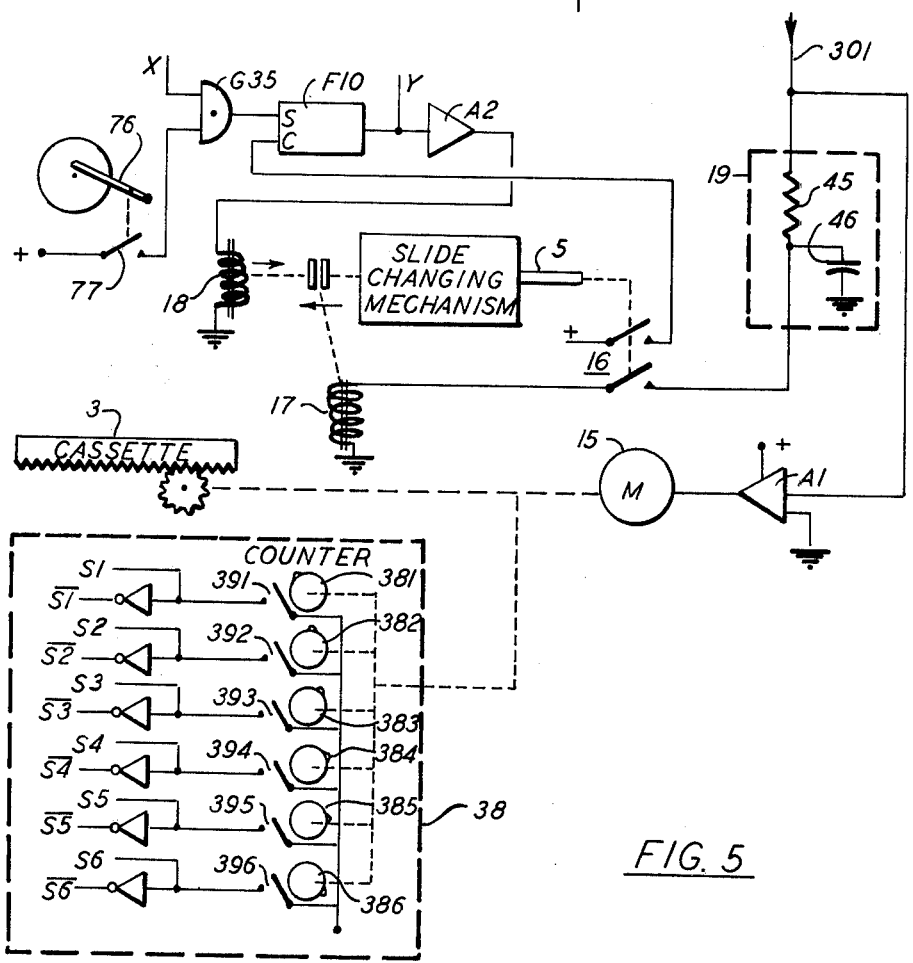
FIG. 5 is a circuit diagram showing the controls for the drive motor as well as the circuit diagram for the position counter.

Referring now to FIGS. 4 and 5, the circuit of comparator 30 will be described in greater detail. The position of slide tray 3 is indicated by the position of drive motor 15 which position is accumulated in counter 38. The position number selected by the operator is stored in main storage 32 and displayed in visual display 36.

The output from the respective latches in main storage 32 appears on lines L1, $\overline{L1}$, L2, $\overline{L2}$, L3, $\overline{L3}$, L4, $\overline{L4}$, L5, $\overline{L5}$, L6, $\overline{L6}$. Counter 38 shown in FIG. 5 provides a signal output depending upon the position of slide tray 3 controlled by drive motor 15. Outputs S1, $\overline{S1}$, S2, $\overline{S2}$, S3, $\overline{S3}$, S4, $\overline{S4}$, S5, $\overline{S5}$, S6 and $\overline{S6}$, provide counter inputs to comparator circuit 30 for comparison with inputs from main storge 32. Counter 38 includes cams 381, 382, 383, 384, 385, and 386 which actuate switches 391, 392, 393, 394, 395 and 396 respectively as motor 15 moves slide tray 3. Switches 391-396 provide outputs S1- S6 respectively and through inverters provide complement outputs $\overline{S1}$ - $\overline{S6}$ respectively.

Latch L2 represents the most significant bit of the 10's digit of the number entered from keyboard 33. Latch L1 represents the least significant bit of the 10's digit of the number entered from keyboard 33. When latch L2 is set, the most significant bit of the 10's digit is a 1, a slide with a position number from 30 to 36 has been selected. AND gate G20 has as inputs L2 and S2. Thus, if L2 and S2 are both active, the output of G20 is not activated. If, however, the complement of S2 is active at a time when latch L2 is active, AND gate G20 provides an active signal to OR gate G22 which provides a forward signal to select motor winding 15b.

Gate G21 has as inputs L2 and S2. Thus, G21 will have an active output in the case where latch L2 is not set (which situation indicates a selected slide position number of 0–29) and S2 is active indicating a position of the slide tray 3 in the range of slides 30–36. If a no compare output appears as the output from gate G21, OR gate G23 is activated causing a reverse signal to be transmitted to select motor winding 15a.

Thus, gates G20 and G21 together with OR gates G22 and G23 provide appropriate signals to activate motor 15 where the most significant bit of the selected slide position number does not compare with the position of the slide tray at that instant.

If either gate G20 or gate G21 has an active output, these outputs being connected to OR gate G24, having an inverted output, gates G25 and G26 are inhibited.

Thus, if a no compare signal is achieved in the most significant bit position, comparison of further bits of the two position numbers is inhibited.

It must be indicated at this point that the comparison of the output of counter 38 with main storage 32 is a continuing process and as the output of latches L1–L6 and signals S1–S6 change, the inputs and outputs of the gates in comparator 30 are also changed.

Gates G25 and G26 compare the next least significant bit in the 10's digit of the selected slide position number with the next least significant bit representing the count from counter 38.

As before, if an output is achieved from gate G25 indicating a no compare in the next significant bit, a forward signal is generated by gate G22. If, on the other hand, an output is achieved from gate G26, a reverse signal is generated by gate G23.

Similarly, gate G27 acts to inhibit comparison by gates G28 and G29 of the first bit of the unit's digit of the selected slide position number.

Gates G-28 to G-33, and further similar gates (not shown), compared further bit positions of the two numbers being compared and selectively operate the forward and reverse gates G22 and G23 in a similar manner.

As can be seen from FIG. 2, comparator 30 has three outputs. The forward and reverse lines are connected via relays (not shown) to select the appropriate winding of motor 15, whereas OR gate G40 has inputs from both the forward and reverse line so that if either forward or reverse signals become active, an active signal appears on line 301 which is applied to motor armature 15c through amplifier A1. Further, line 301 also acts through delay 19 which can be a series RC circuit having a resistor 45 and capacitor 46 to energize solenoid 17 after a short delay. When the forward or reverse signal becomes deactivated, the output of G40 falls, indicating the slide tray 3 has reached the position selected by the operator and stopping motor 15. After a short delay controlled by delay 19, solenoid 17 is de-energized, causing the flywheel 4 shown in FIG. 1 to move the slide change mechanism and causing the selected slide to be moved to the projection position as described above with respect to FIG. 1.

Audio pickup arm 76 causes switch 77 to close when the arm reaches the end of the recording. No action or movement occurs until a new number is selected from the keyboard 33. When a valid number has been selected, line X, the output of F9, is raised as an input to gate G35 setting latch F10 and activating solenoid 18 through amplifier A2. Setting latch F10 also activates line Y clearing latch F9. The action of solenoid 18 causes the slide changing mechanism to operate, moving the previous slide back to the appropriate position in the slide tray 3. When the slide changing mechanism has completed its leftward (in FIG. 1) travel, position sense switch 16 is activated, which clears latch F10 and energizes solenoid 17, interrupting flywheel drive of the slide-changing mechanism and allowing slide tray 3 to move to the new selected position.

Figure 6:
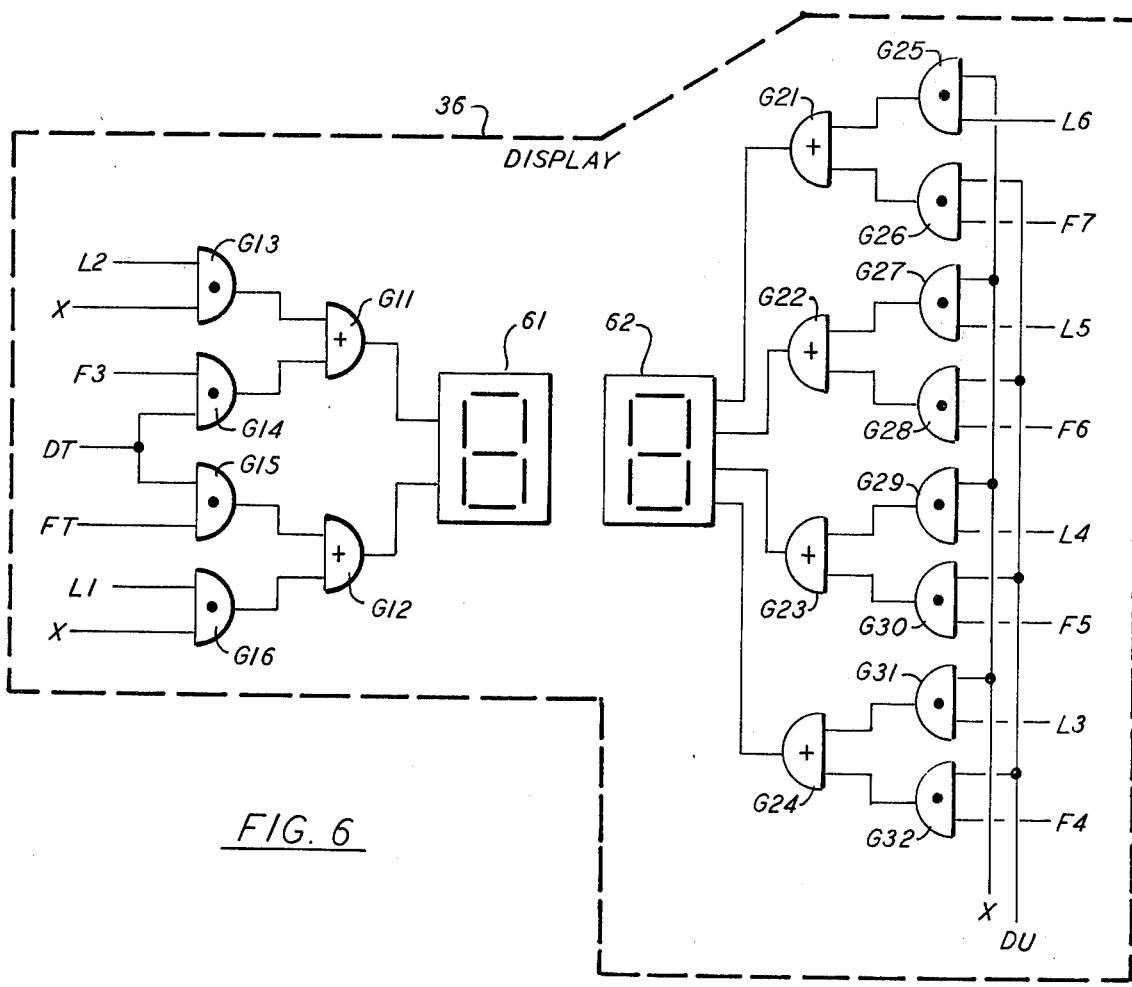
FIG. 6 is a logic diagram showing the controls for the numerical display unit.

Referring now to FIG. 6, visual display 36 is shown including a 7-bar indicator 61 for displaying the 10's position and 7-bar indicator 62 for displaying the units position of the selected position slide number. Indicators 61 and 62 may be selected from commercially available units such as Texas Instruments Ser. No. 7446. Gates G13, G14, G15, and G16 are AND gates which are connected to the appropriate outputs of intermediate buffer storage 34 and main storage 32 with enabling lines DT gating the output of intermediate storage 34 to gates G14 and G15 and line X gating the outputs of L1 and L2 to gates G13 and G16. The respective outputs of G13, G14, G15 and G16 are connected to OR gates G11 and G12 which are connected to the indicator unit 61.

In a similar manner, the unit's digit is displayed in 7-bar indicator 62 through combinations of gates G21–G32. Inputs to gates G25–G32 are connected to latches L6, F7, L5, F6, L4, F5, L3 and F4 respectively with gating signal DU for gating the outputs of the intermediate storage 34 and line X for gating the outputs of main storage 32 to the respective OR circuits G21–G24.

It should be understood that although the present invention has been described with respect to apparatus for controlling a slide - sound projector, the invention is equally applicable to any projection system having a slide tray moveable along an axis parallel to the projection axis.

While the present invention has been described with reference to preferred embodiments thereof, it is understood by those skilled in the art that various changes in form and application of the sound-slide projector control apparatus may be made without departing from the spirit or scope of the invention.

What is claimed is:

1. Sound-slide projection and sound transmission apparatus, comprising, in combination: optical projection means and sound transmission means located at a projection position; a slide tray reciprocable along a first axis to align respective sound-slides carried in said tray with an insertion slot; a sound-slide translating means reciprocable along a second axis perpendicular to said first axis between extended and retracted positions for transferring respective ones of sound-slides through said insertion slot between said slide tray and said projection position; a pivotable arm connected to reciprocate said sound-slide translating means, rotatable pinion means operable during each of its revolutions to pivot said arm to reciprocate said sound-slide translating means from said extended position to said retracted position and then back to said extended position; a constant-speed flywheel; a first solenoid controlled by said sound transmission means and operable upon the completion of sound transmission from a sound-slide at said projection position to mechanically engage said pinion means with said flywheel and cause one revolution of said pinion means; a keyboard means for providing a first electrical signal representing a desired sound-slide; a servomotor means for moving said slide tray along said first axis to a position along said first axis commensurate with said first electrical signal; a second solenoid operable to disconnect said pinion means from said flywheel to interrupt translation of said sound-slide translating means; and switch means operable upon translation of said sound-slide translating means to said retracted position for temporarily operating said second solenoid and said servomotor means.

2. Apparatus according to claim 1 in which said servomotor means comprises a reversible motor for moving said slide tray along said first axis, means for providing a second electrical signal commensurate with the position of said slide tray along said first axis, and comparator means for comparing said first and second electrical signals and providing control signals to drive said reversible motor.

3. Apparatus according to claim 1 which includes time delay means for delaying the response of said second solenoid to operation of said switch means.

4. Apparatus according to claim 1 wherein said keyboard means comprises a plurality of keyboard switches for providing digital signals representing said desired sound-slide, first storage means for storing said first electrical signal, and intermediate storage means including a validity testing circuit interposed between said keyboard switches and said first storage means, and validity testing circuit comprising gate means operable to apply only numbers of a predetermined group of numbers to said first storage means.

5. Apparatus according to claim 4 having numerical display means connected to display numbers stored in said first storage means.

6. Sound-slide projection and transmission apparatus which allows random retrieval of sound slides from a slide tray reciprocable along a first axis, comprising, in combination, a slide-changing mechanism which includes slide translating means reciprocable along a second axis perpendicular to said first axis between extended and retracted positions, said slide translating means being operable to move a slide from a projection position to within said tray upon translation from said extended position to said retracted position and operable to move a slide from within said tray to said projection position upon translation from said retracted position to said extended position, said apparatus including a flywheel, and means for mechanically connecting said mechanism to be operated by said flywheel, said mechanism being operated through a cycle each time it is operated by said flywheel, said cycle consisting of a translation from said extended position to said retracted position followed by translation from said retracted position to said extended position; a reversible drive motor means connected to position said tray along said first axis, keyboard means for providing signals representing a slide desired to be retrieved; a solenoid operable to interrupt operation of said slide-changing mechanism by said flywheel; and switch means for temporarily operating said solenoid and connecting said motor to respond to said signals when said slide translating means is translated to said retracted position.

* * * * *